United States Patent
Cooke et al.

(10) Patent No.: US 7,475,083 B2
(45) Date of Patent: *Jan. 6, 2009

(54) POLYARCHICAL DATA INDEXING AND AUTOMATICALLY GENERATED HIERARCHICAL DATA INDEXING PATHS

(75) Inventors: Jonathan Guy Grenside Cooke, Torquay (GB); Andrew Richard Young, New York, NY (US)

(73) Assignee: Factiva, Inc., Monmouth Junction, NJ (US)

( * ) Notice: Subject to any disclaimer, the term of this patent is extended or adjusted under 35 U.S.C. 154(b) by 157 days.

This patent is subject to a terminal disclaimer.

(21) Appl. No.: 11/130,815

(22) Filed: May 17, 2005

(65) Prior Publication Data

US 2006/0004741 A1    Jan. 5, 2006

Related U.S. Application Data

(63) Continuation of application No. 09/796,681, filed on Mar. 2, 2001, now Pat. No. 6,938,046.

(51) Int. Cl.
*G06F 17/00*    (2006.01)

(52) U.S. Cl. .................. 707/101; 707/102; 707/103 Y; 707/104.1

(58) Field of Classification Search ...... 707/2, 707/3, 5, 101, 102, 103 R, 103 RY, 104.1; 717/160

See application file for complete search history.

(56) References Cited

U.S. PATENT DOCUMENTS

| | | | |
|---|---|---|---|
| 4,760,526 A | 7/1988 | Takeda et al. | |
| 5,375,235 A | 12/1994 | Berry et al. | |
| 5,392,037 A | 2/1995 | Kato | |
| 5,594,641 A | 1/1997 | Kaplan et al. | |
| 5,625,554 A | 4/1997 | Cutting et al. | |
| 5,647,058 A | 7/1997 | Agrawal et al. | |
| 5,701,459 A | 12/1997 | Millett et al. | |
| 5,758,361 A | 5/1998 | van Hoff | |
| 5,787,417 A | 7/1998 | Hargrove et al. | |
| 5,794,236 A * | 8/1998 | Mehrle | 707/5 |
| 5,799,311 A * | 8/1998 | Agrawal et al. | 707/102 |
| 5,832,494 A | 11/1998 | Egger et al. | |

(Continued)

OTHER PUBLICATIONS

Tamara Kolda et al., "A Semidiscrete Matrix Decomposition for latent Semantic Indexing in Information Retrieval", ACM, Oct. 1998, pp. 322-346.*

(Continued)

*Primary Examiner*—Thuy N Pardo
(74) *Attorney, Agent, or Firm*—Dorsey & Whitney LLP (57) ABSTRACT

Data indexing using polyarchical indexing codes and automatically generated expansion paths. For a piece of data, an indexing code is received relating to a particular categorization or other indexing parameter. Based upon the indexing code, one or more expansion sets of codes are retrieved and applied to the piece of data. The expansion sets of codes may include indexing codes that relate to hierarchical levels of indexing. The expansion sets of codes may also include different expansion paths through the hierarchical levels of indexing. The polyarchical codes may include multiple cross-categorization of the data across the same or different levels of categories. They may also include multiple expansion paths in different directions across hierarchical levels of categories or indexing.

42 Claims, 10 Drawing Sheets

U.S. PATENT DOCUMENTS

| | | | |
|---|---|---|---|
| 5,873,087 A | 2/1999 | Brosda et al. | |
| 5,924,090 A | 7/1999 | Krellenstein | |
| 5,970,493 A | 10/1999 | Shoup et al. | |
| 5,983,217 A | 11/1999 | Khosravi-Sichani et al. | |
| 6,003,040 A | 12/1999 | Mital et al. | |
| 6,035,125 A * | 3/2000 | Nguyen et al. | 717/160 |
| 6,038,560 A | 3/2000 | Wical et al. | |
| 6,041,147 A | 3/2000 | Mead | |
| 6,088,699 A | 7/2000 | Gampper et al. | |
| 6,138,115 A * | 10/2000 | Agrawal et al. | 707/3 |
| 6,148,295 A * | 11/2000 | Megiddo et al. | 707/3 |
| 6,154,746 A | 11/2000 | Berchtold et al. | |
| 6,157,923 A | 12/2000 | Ivler et al. | |
| 6,163,780 A | 12/2000 | Ross | |
| 6,195,661 B1 | 2/2001 | Filepp et al. | |
| 6,223,182 B1 | 4/2001 | Agarwal et al. | |
| 6,353,820 B1 * | 3/2002 | Edwards et al. | 707/2 |
| 6,457,014 B1 | 9/2002 | Parker | |
| 6,529,913 B1 | 3/2003 | Doig et al. | |
| 6,535,869 B1 * | 3/2003 | Housel, III | 707/2 |
| 6,725,223 B2 * | 4/2004 | Abdo et al. | 707/100 |
| 6,734,886 B1 | 5/2004 | Hagan et al. | |
| 6,735,595 B2 * | 5/2004 | Gobeille et al. | 707/102 |
| 6,785,683 B1 * | 8/2004 | Zodik et al. | 707/101 |
| 6,938,046 B2 | 8/2005 | Cooke et al. | |
| 2002/0107860 A1 * | 8/2002 | Gobeille et al. | 707/101 |

OTHER PUBLICATIONS

Soumen Chakrabarti et al., "Scalable Feature Selection, classification and signature Generation for organizing Large Databases into Hierarchical Topic Taxonomies", ACM, 1998, pp. 163-178.*

Associative and Spatial Relationships in Thesaurus-Based Retrieval, by H. Alani et al, *Proceedings of 4th European Conference on Research and Advanced Technology for Digital*, (ECDL 2000), 2000, pp. 45-58.

* cited by examiner

POLYARCHICAL DATA INDEXING AND AUTOMATICALLY GENERATED HIERARCHICAL DATA INDEXING PATHS

FIELD OF THE INVENTION

The present invention relates to an apparatus and method for indexing data using polyarchical indexing codes and automatically generating indexing paths extending across multiple hierarchical levels.

BACKGROUND OF THE INVENTION

Indexing of documents is useful for categorizing the content for later searching, retrieval and possibly other operations. Indexing can involve applying a code to the document which-relates to its subject matter. The codes are then linked with the categories for various types of subject matter. In order to search for all documents containing content in a particular category, a computer system can simply retrieve all documents containing the code linked for that category.

The accuracy of traditional indexing of documents relies heavily on the person applying the codes to the documents. Each particular code must be individually and manually entered throughout each document. Therefore, if a document relates to one particular category "A" but was coded under a different category "B," a search within the category "A" will most likely not result in an identification of the document.

Also, the granularity of coding is also manually entered. This manual coding means that a person must enter codes relating to broad categories for a document as well as any codes for more narrow categories. If different persons are coding documents, as is often the case due to high volume, different and potentially inconsistent applications of granular coding can result. As a result, different coders may apply various broad and narrow categories in different manners, resulting in less effective indexing.

Accordingly, a need exists for improved methods and taxonomies for indexing data.

SUMMARY OF THE INVENTION

A method and apparatus consistent with the present invention indexes data using automatically generated indexing codes. An indexing code is received relating to a particular piece of data. Based upon that indexing code, an expansion set of codes is automatically retrieved and applied to the data. An indication of the data is then stored along with the associations resulting from application of the expansion set of codes to the data.

Another method and apparatus consistent with the present invention indexes data using multiple polyarchical indexing. An indexing code is received relating to a particular piece of data. Based upon the indexing code, multiple polyarchical codes are automatically retrieved and applied to the data. These polyarchical codes can then be used for cross-categorization of the data. An indication of the data is stored along with the associations resulting from application of the multiple polyarchical codes to the data.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of the present invention relate to a taxonomy that helps to automate data indexing and result in a relatively consistent application of indexing codes to the data. The taxonomy includes polyarchical coding, also referred to as polyarchies, which involves using multiple higher level codes applied to the same lower level code. The polyarchical coding means that, for example, a coder need only enter one lower level code for a piece of data and the higher level polyarchical codes are automatically applied, resulting in a consistent application of coding structures.

The taxonomy also includes the automatic generation of expansion paths. When a coder enters a lower level code, a series of related codes across higher coding levels are automatically applied. Therefore, upon application of only a lower level code, the corresponding data is automatically coded with the related hierarchical codes. This feature also provides for consistent application of the related codes.

Data Indexing Structures

Figure 1:
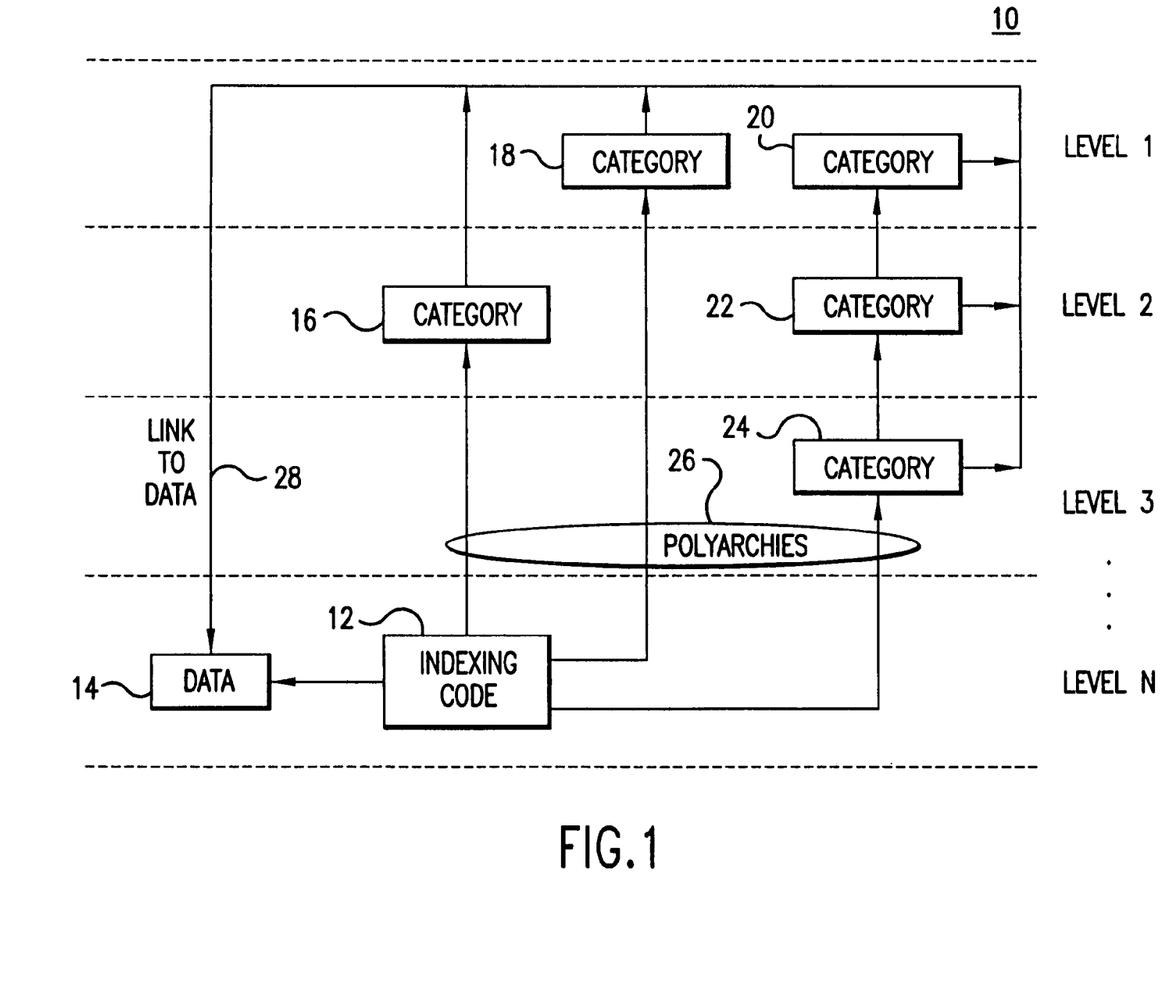
FIG. 1 is a diagram conceptually illustrating polyarchical data indexing.

FIG. 1 is a diagram of a structure 10 conceptually illustrating polyarchical data indexing. Structure 10 includes multiple coding levels 1-N, which may represent, for example, multiple hierarchical levels of coding from a narrow category at the lowest level (level N) to increasingly broader or more general categories spanning to potentially the top level (level 1). An indexing code 12 relates to a particular categorization or other types of indexing of a piece of data 14. Additional broader categories in this example are associated with indexing code 12. For example, indexing code 12 is associated with a category 16 at level 2; a category 18 at level 1; and categories 20, 22, and 24 at levels 1, 2, and 3. Each of the related categories, as represented by a link 28, is also associated with the data 14.

The use of multiple related categories, for example, across the same or various higher levels is referred to as polyarchies 26. Each level represents in this example different categories with the same general categorical subject matter. With polyarchical coding, the indexing or coding is expanded in multiple directions upwardly across different levels. As an example, if the indexing code 12 specifies a category of on-line brokerages for data 14, then category 16 may relate to financial services and category 18 may relate to Internet activity. Therefore, data 12 relating to on-line brokerages in this example is also indexed more broadly under those two higher level categories. As illustrated, the higher level categories or coding can exist vertically across one or more higher levels, and the polyarchies can exist horizontally across one or more of the same or different levels. Therefore, polyarchical codes can include, for example, two or more indexing codes associated with data on different paths in an upward indexing direction, as illustrated.

The levels and configuration shown in structure 10 are presented for illustrative purposes only. The term "category" includes both categories and sub-categories. The types and ordering of the categories may depend upon, for example, a particular implementation, the type of data to be coded and particular desired or necessary requirements for the indexed data. The term "indexing code" or "code" includes any type of identifier associated with a particular category or element for use in any type of indexing or organizing of data. For example, the indexing code may be implemented with numerical or alphanumerical characters electronically linked with the corresponding category.

Figure 2:
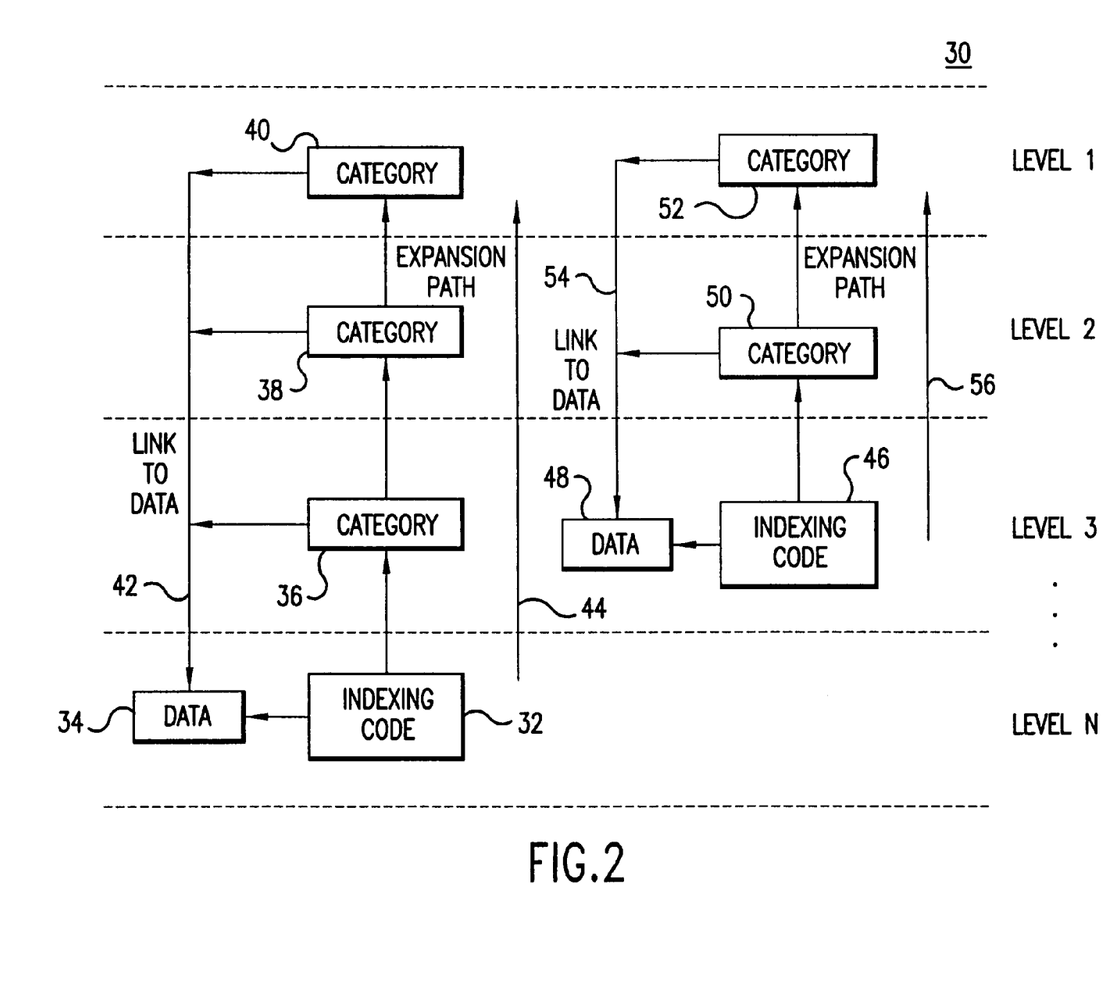
FIG. 2 is a diagram conceptually illustrating automatically generated expansion paths for data indexing.

FIG. 2 is a diagram of a structure 30 conceptually illustrating automatically generated expansion paths, having expansion sets of codes, for data indexing across the multiple levels 1-N. This example includes an indexing code 32 associated with a piece of data 34 and an indexing code 46 associated with a piece of data 48. Indexing code 32 is associated with a series of categories 36, 38, and 40 across multiple higher levels of indexing. Indexing code 46 is likewise associated with a series of higher level categories 50 and 52. In this example and as identified above, the levels represent increasingly broader categories from the lowest level (level N) to the highest level (level 1).

The series of categories 36, 38, and 40 represent an expansion path 44, and the series of categories 50 and 52 represent an expansion path 56. The expansion path means that the indexing represented by a particular indexing code is expanded upward across potentially multiple, higher levels of coding. Each of the codes in the expansion paths, as represented by links 42 and 54 is associated with the corresponding piece of data.

The expansion paths can be automatically applied, for example, depending upon a particular implementation. Therefore, when indexing code 32 is entered for data 34, the codes for the categories in expansion path 44 can be automatically generated and associated with data 34. Likewise, when indexing code 46 is entered for data 44, the codes for the categories in expansion path 56 can be automatically generated and associated with data 48. The expansion paths shown are provided for illustrative purposes only. The expansion paths, and the expansion sets of codes for implementing them, can span any number of levels, possibly originate at any of the levels and span across levels having any type of relationships for indexing or organizing data. The exemplary levels are shown with a hierarchical relationship; however, other types of relationships among the levels may alternatively be used.

Table 1 provides an example of an expansion path. In this example, when the code "I25782" is entered for a piece of data relating to analgesics manufacturing, the codes in levels 1-4 are automatically generated and associated with the data. As shown, the categories are increasingly broader from level 5 to level 1. The indexing codes and categories shown in Table 1 are provided for illustrative purposes and are only one such example.

TABLE 1

| Level | Indexing Code | Category |
|-------|---------------|----------|
| 1 | I2 | Metals, Minerals and Chemicals |
| 2 | I25 | Chemical Manufacturing |
| 3 | I257 | Pharmaceuticals |
| 4 | I2578 | Over-the-Counter Drug Manufacturing |
| 5 | I25782 | Analgesics Manufacturing |

Figure 3:
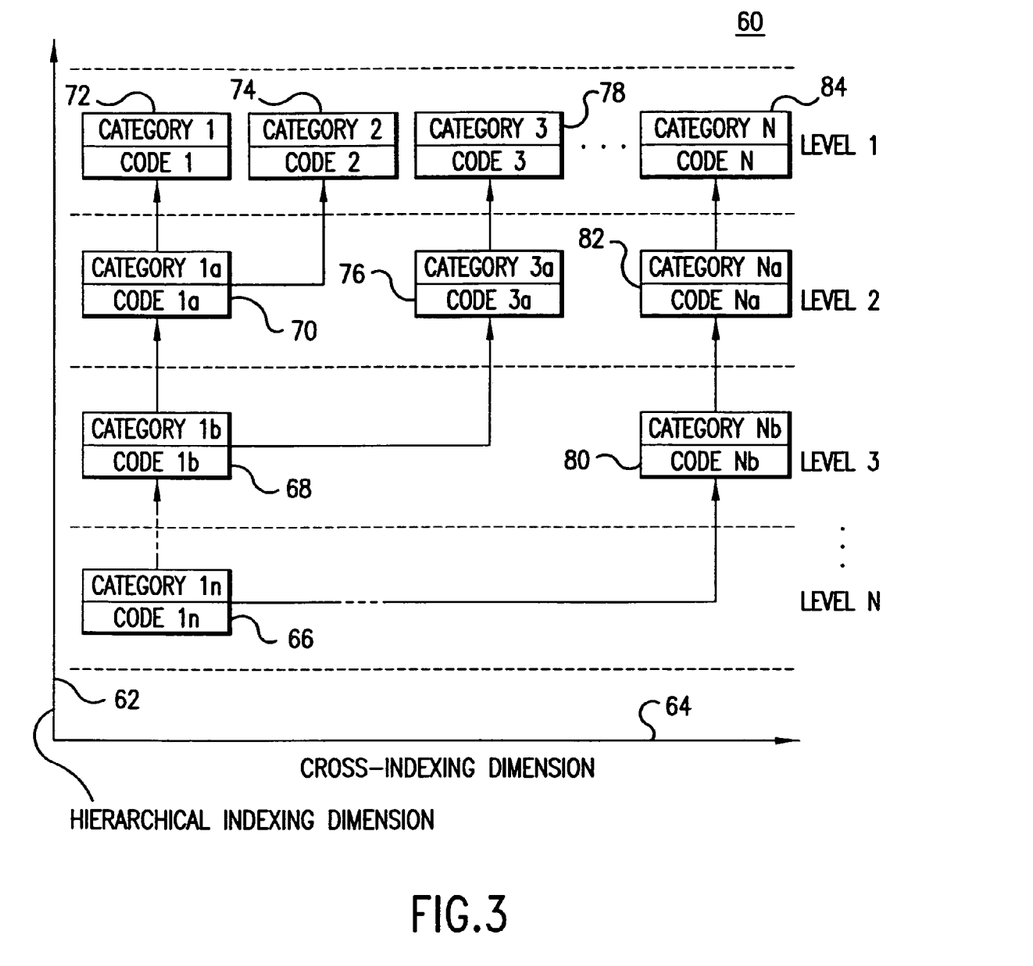
FIG. 3 is a diagram of a data indexing structure illustrating both polyarchies and expansion paths.

FIG. 3 is a diagram of a data indexing structure 60 having both polyarchies and expansion paths. In structure 60, an indexing code and category 66 is associated with polyarchies that include higher level categories 68, 70, and 72 for one expansion path and higher level categories 80, 82, and 84 for another expansion path. Each category in an expansion path can itself possibly have polyarchies. For example, indexing code and category 68 is associated with another expansion path including higher level categories 76 and 78, and indexing code and category 70 is associated with another expansion path including a higher level category 74.

Upon application of a particular indexing code to a piece of data, the codes in the polyarchies and expansion paths are also linked with the data, as illustrated above. Therefore, indexing in structure 60 has a cross-indexing dimension 64 representing multiple categorization across the same levels and a hierarchical indexing dimension 62 representing multiple categorization across different levels. The polyarchies can be generated, for example, from any level. Also, the expansion paths can span one or more levels, from one level to any other higher level.

Structure 60 can be implemented within any type of electronic data structure that specifies indexing codes, links them with categories and specifies the polyarchies and expansion paths. For example, it can be specified in a relational database, object-oriented database, an Extensible Markup Language (XML) database, or any other type of database. Therefore, upon application of a particular indexing code, the data structure can be accessed to retrieve the corresponding expansion paths in order to automatically apply them to the data.

Computer System for Data Indexing

Figure 4:
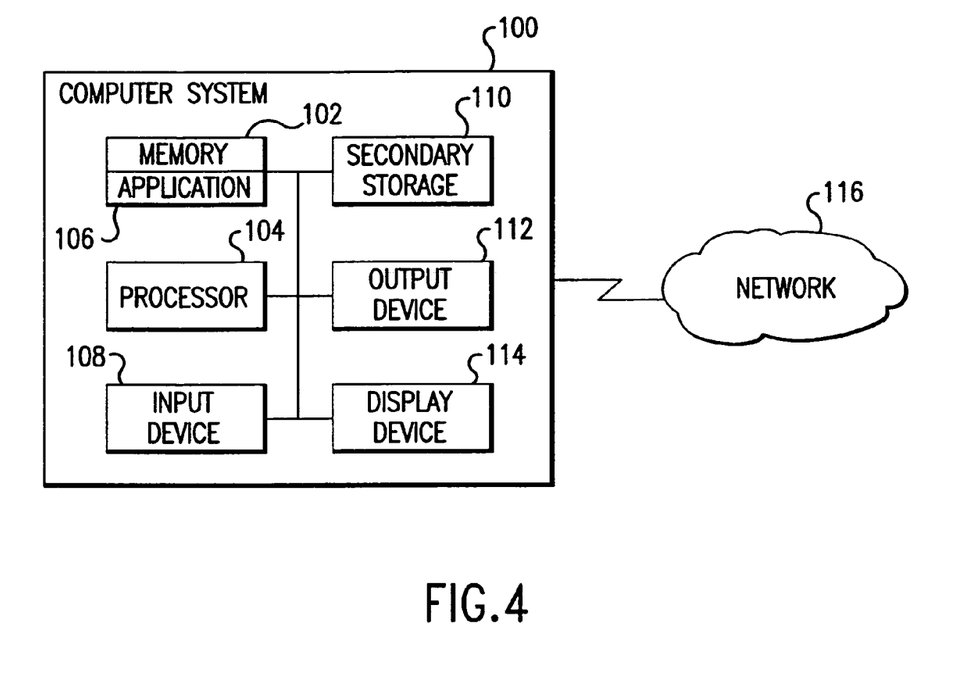
FIG. 4 is a block diagram of a computer system for implementing data indexing methods.

FIG. 4 is a block diagram of a computer system 100 for use in executing data indexing methods and storing data indexing structures. Computer system 100 can include a connection with a network 116 such as the Internet. Network 116 represents any type of wireline or wireless network and can be used, for example, to access data for indexing or rules related to data indexing. Computer system 100 typically includes a memory 102, a processor 104, an input device 108, a display device 114, an output device 112 and a secondary storage device 110.

Memory 102 may include random access memory (RAM) or similar types of memory, and it may store one or more applications 106 for execution by processor 104. Secondary storage device 110 may include a hard disk drive, floppy disk drive, CD-ROM drive or other types of non-volatile data storage. Processor 104 may execute applications or programs stored in memory 102 or secondary storage 110 or received from the Internet or other network 116. Input device 108 may include any device for entering information into computer system 100, such as a keyboard, key pad, cursor-control device, touch-screen (possibly with a stylus) or microphone. Display device 114 may include any type of device for presenting visual information such as a computer monitor, flat-screen display or display panel. Output device 112 may include any device for generating a hard copy of information or may include speakers for presenting information in audio form. Computer system 100 can possibly include multiple input devices, output devices and display devices.

Although computer system 100 is depicted with specific components, one skilled in the art will appreciate that this system can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or read-only memory (ROM). The computer-readable media may include instructions for controlling computer system 100 to perform by a particular method.

Data Indexing and Related Methods

Figure 5:
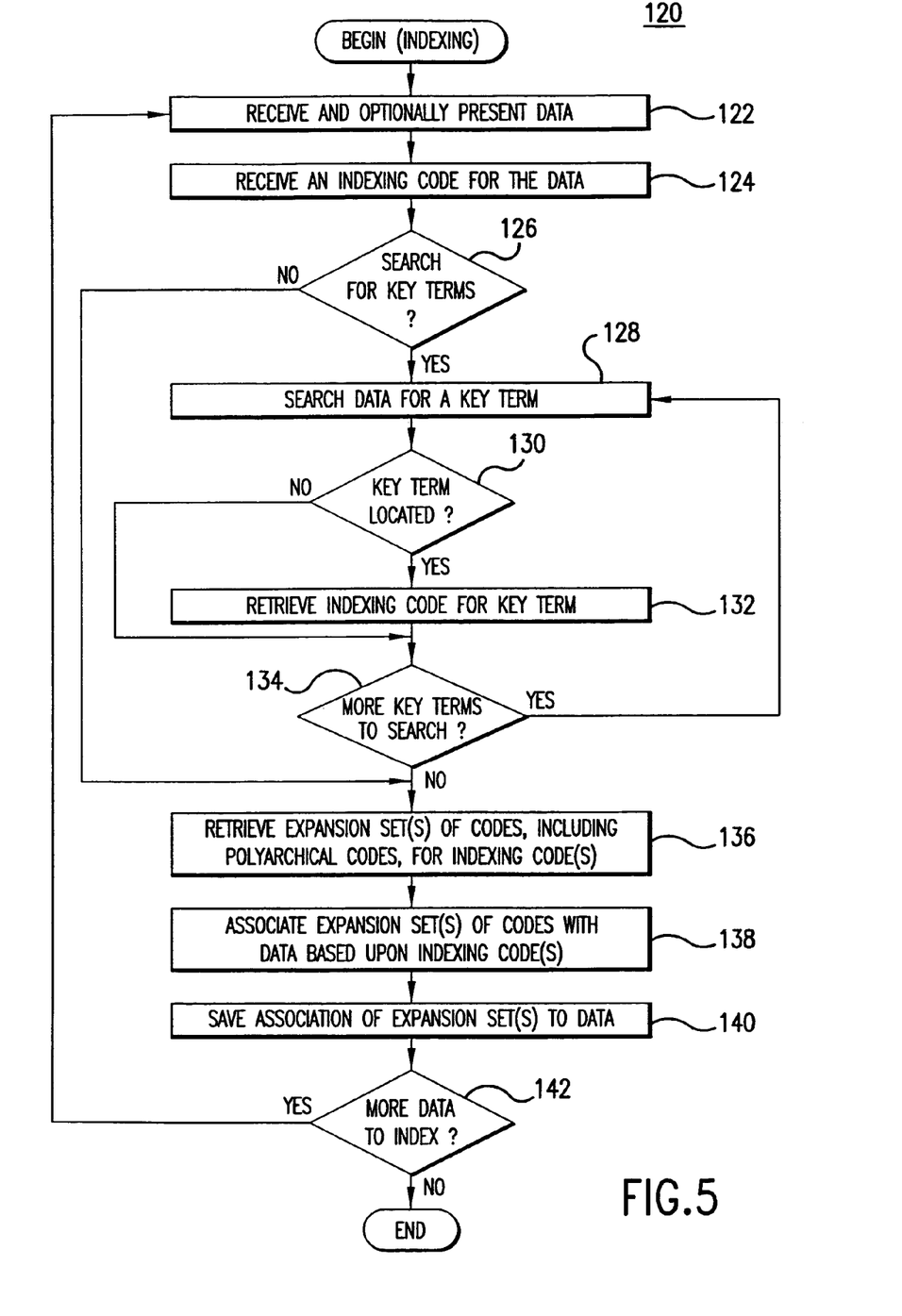
FIG. 5 is a flow chart of a method for polyarchical data indexing and automatic generation of data indexing paths.

FIG. 5 is a flow chart of a method 120 for data indexing for execution by computer system 100. Method 120 can be implemented, for example, in software modules stored in memory 102 for execution by processor 104 along with appropriate user interaction, if required, via input device 108. In method 120, the system receives and optionally presents data for indexing (step 122). If the indexing occurs programmatically, for example, the system need not necessarily display the data. If it occurs through user input, then the system can display a screen for presenting the data and receiving indexing codes for it.

Figure 8:
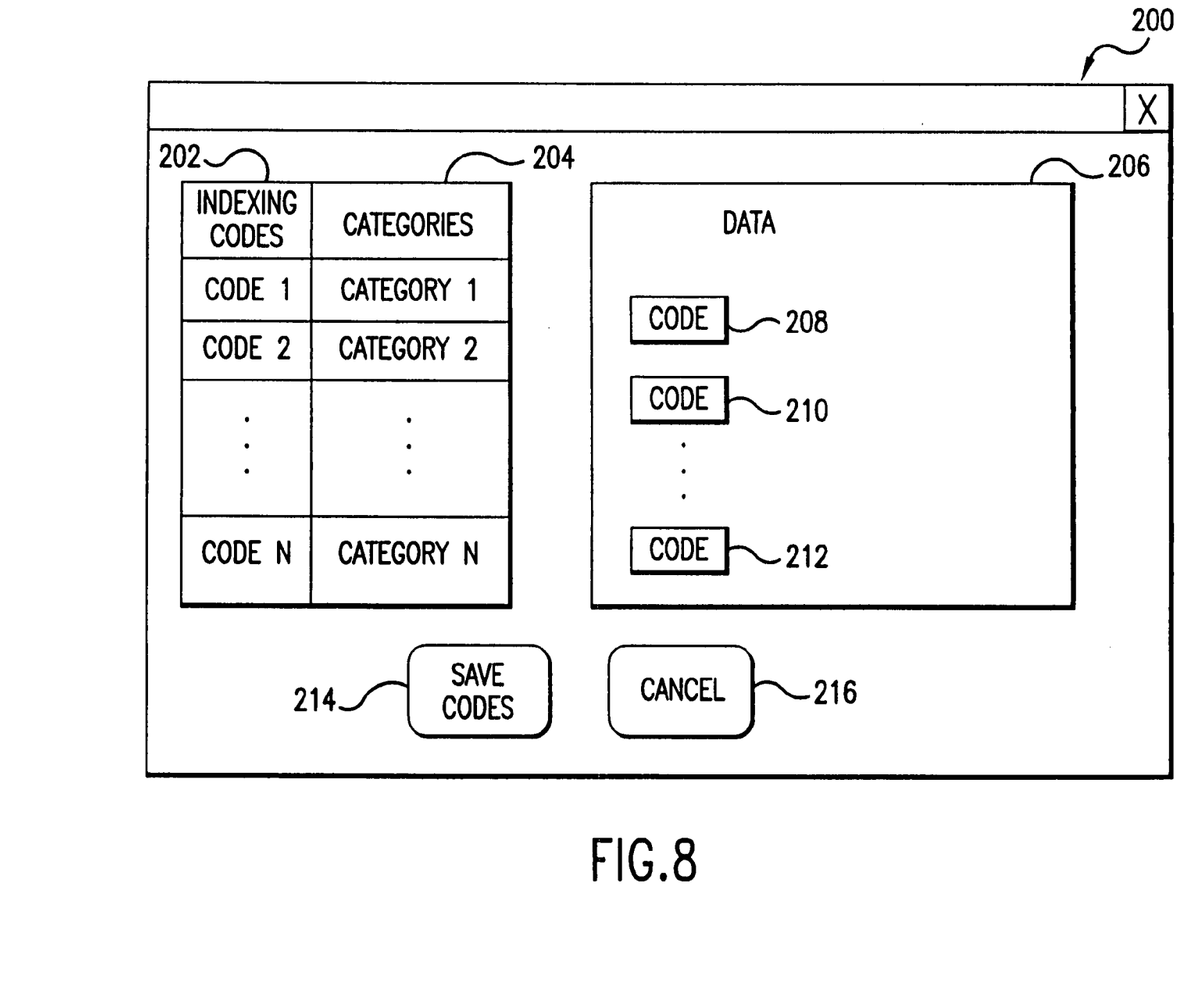
FIG. 8 is a diagram of an exemplary user interface for receiving indexing codes for use in data indexing.

FIG. 8 is a diagram of an exemplary user interface 200 to display data and receive indexing codes. Screen 200 can be displayed on display device 114 and may include an indexing codes section 202 to display indexing codes and a categories section 204 to display the categories corresponding to the indexing codes. These can be displayed, for example, in a pull-down menu to accommodate a potentially large number of indexing codes.

A data section 206 can present data for indexing. The term "data" refers to any information which can be indexed and examples include, but are not limited to, news, publications, textual information, graphics, pictures or photographic information, images, information in multiple languages or any other information. For example, a user can retrieve news from wire sources over network 116 and view the news in section 206 for indexing. As illustrated, a user can entered indexing codes at particular locations in the data as represented by codes 208, 210 and 212. The indexing codes can be entered through any type of user input via input device 108; for example, the user may type in the indexing code or "drag and drop" the indexing code from section 202 to the data using a cursor control device. Screen 200 also includes a save section 214 for the user to select in order to save the entered indexing codes and apply them to the data and a cancel section 216 for the user to select in order to cancel the entered indexing codes.

In method 120, the system receives one or more indexing codes for the data (step 124), which can include indexing codes manually entered, such as through screen 200, and indexing codes programmatically generated. The indexing codes can relate to, or be used for, any type of categorization, which includes, but is not limited to, the following examples: company information, geographic information, subject matter information or industry information.

For automatic indexing, the system can search for key terms in the data and retrieve associated indexing codes. Key terms are those words or other data elements, such as images or pictures, having an associated indexing code. The non-word information, such as images, may be associated with indexing codes by using, for example, identifiers for the information; for example, images can have identifiers such as uniform resource locators (URLs) and those identifiers can be linked with indexing codes. Table 2 conceptually illustrates linking of key terms with indexing codes. For non-word information, identifiers can be designated as terms.

TABLE 2

| Key Term | Indexing Code |
|---|---|
| term 1 | code 1 |
| term 2 | code 2 |
| ... | |
| term N | code N |

If the system is configured to search for key terms (step 126), it determines whether a key term exists in the data (step 128). It can use any searching algorithm, such as sequentially comparing each word in the data with each key term, as illustrated in Table 2, or by re-organizing the data, such as through alphabetizing each word and then identifying key terms. If the system locates a key term in the data (step 130), it retrieves the corresponding indexing code by, for example, accessing a data structure associating key terms with indexing codes (step 132). If more key terms exist to search (step 134), the system returns to step 126 to process the next key term.

If no more key terms exist (step 134) or if searching for them was not required (step 126), the system retrieves expansion set(s) of codes for the indexing codes entered by the user and possibly located through the searching (step 136). Those expansion sets can include a plurality of codes spanning indexing levels, polyarchical codes and combinations of both, as described above. Also, the expansion sets can include the corresponding indexing code as a part of the set. Table 3 conceptually illustrates the association of indexing codes with one or more expansion sets of codes.

TABLE 3

| Indexing Code | Expansion Codes |
|---|---|
| code 1 | codes 1a, 1b, ... 1n |
| code 2 | codes 2a, 2b, ... 2n |
| ... | |
| code N | codes Na, Nb, ... Nn |

The system associates the expansion set(s) of codes with the data based upon the indexing code(s) (step 138). This association means that the system generates the relationships between the codes and the data to be indexed, as illustrated in the structures above and saves the association for further processing or other purposes (step 140). For example, the system can store the data in one central location and specify pointers or links from the codes to the data storage location. The association can include the entire data or a particular portion of it depending upon, for example, where the user entered an indexing code or where the system located a key term.

If more data is to be indexed (step 142), the system returns to step 122 to repeat method 120. For example, the user may retrieve additional data via network 116 and view it in data section 206 for indexing.

Figure 6:
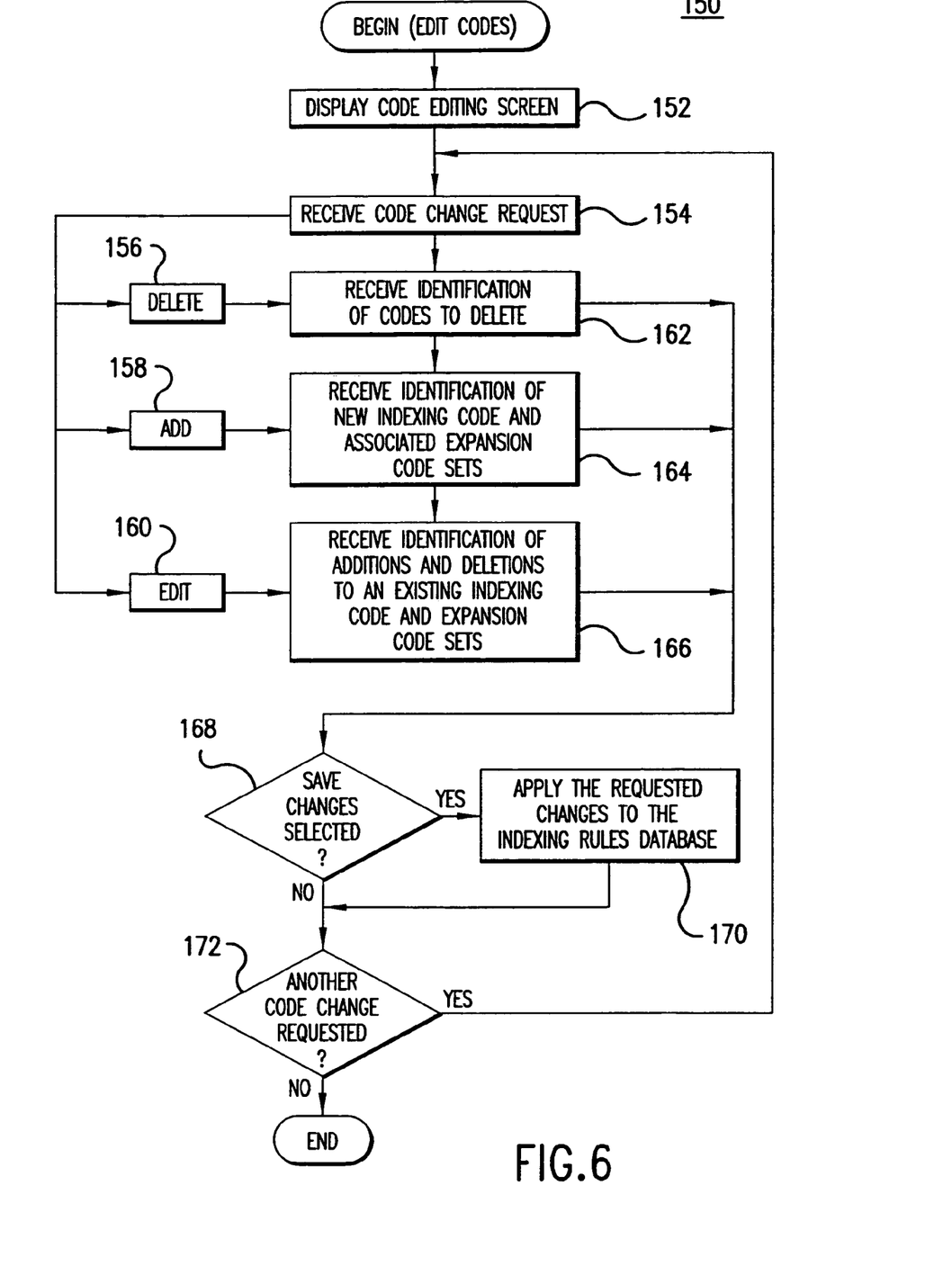
FIG. 6 is a flow chart of a method for editing indexing codes.

FIG. 6 is a flow chart of a method 150 for editing indexing codes. The method 150 can be implemented, for example, in software modules stored in memory 102 for execution by processor 104 along with appropriate user interaction, if required, via input device 108. In method 150, the system displays a code editing screen for permitting the user to edit or change indexing codes and expansion sets of codes (step 152).

Figure 9:
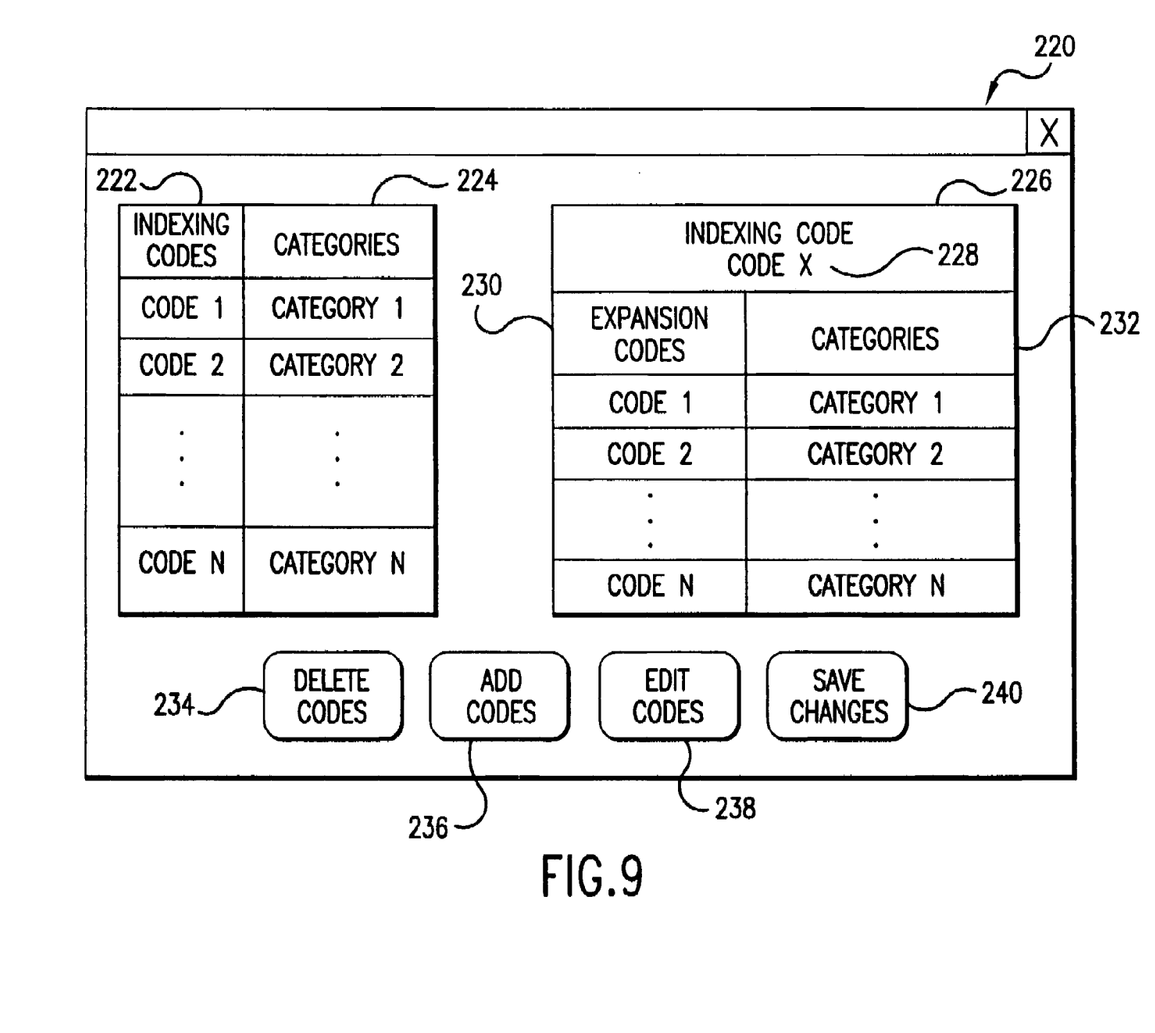
FIG. 9 is a diagram of an exemplary user interface for allowing a user to edit indexing codes.

FIG. 9 is a diagram of an exemplary user interface 220 for a code editing screen. Screen 220 can be displayed on display device 114, and it may include indexing codes section 222 (to display indexing codes) and categories section 224 (to display the categories) as described with respect to screen 200. A code editing section 226 allows a user to make changes to the indexing codes. A user can enter an indexing code 228 by, for example, typing in the code or "dragging and dropping" it from indexing codes section 222. The system can then display in section 230 the expansion set(s) of codes for indexing code 228 and display in a section 232 the corresponding categories.

The user can make various types of changes to the codes. By selecting a delete codes section 234, the user can delete particular identified indexing codes or a selected expansion set of codes in section 226. By selecting an add codes section 236, the user can add a new indexing code and associated expansion codes entered in section 226. By selecting an edit codes section 238, the user can change (add and delete) expansion codes corresponding to an indexing code in section 226. Selection of a save section 240 saves the entered changes within, for example, a coding rules database.

In method 150, the system receives a code change request through, for example, a user's selection of section 234, 236, or 238 (step 154). The system then receives a particular type of change. For a code deletion (step 156), the system receives an identification of codes to delete, such as selection of an indexing code or particular expansion codes for it in section 226 (step 162). For a code addition (step 158), the system receives a new indexing code and associated expansion set(s) of codes in section 226 (step 164). For a code edit (step 160), the system receives an identification of additions and deletions of expansion codes for an indexing code in section 226 (step 166).

If the user selects save changes section 240 (step 168), the system applies the requested changes to the indexing structure. For example, the system can make the changes in an indexing rules database that specifies the indexing codes, categories, expansion sets of codes, and the relationships between them (step 170). If the user requests another code change such as by again selecting one of the sections 234, 236, and 238 (step 172), the system returns to step 154 to process the next request.

Figure 7:
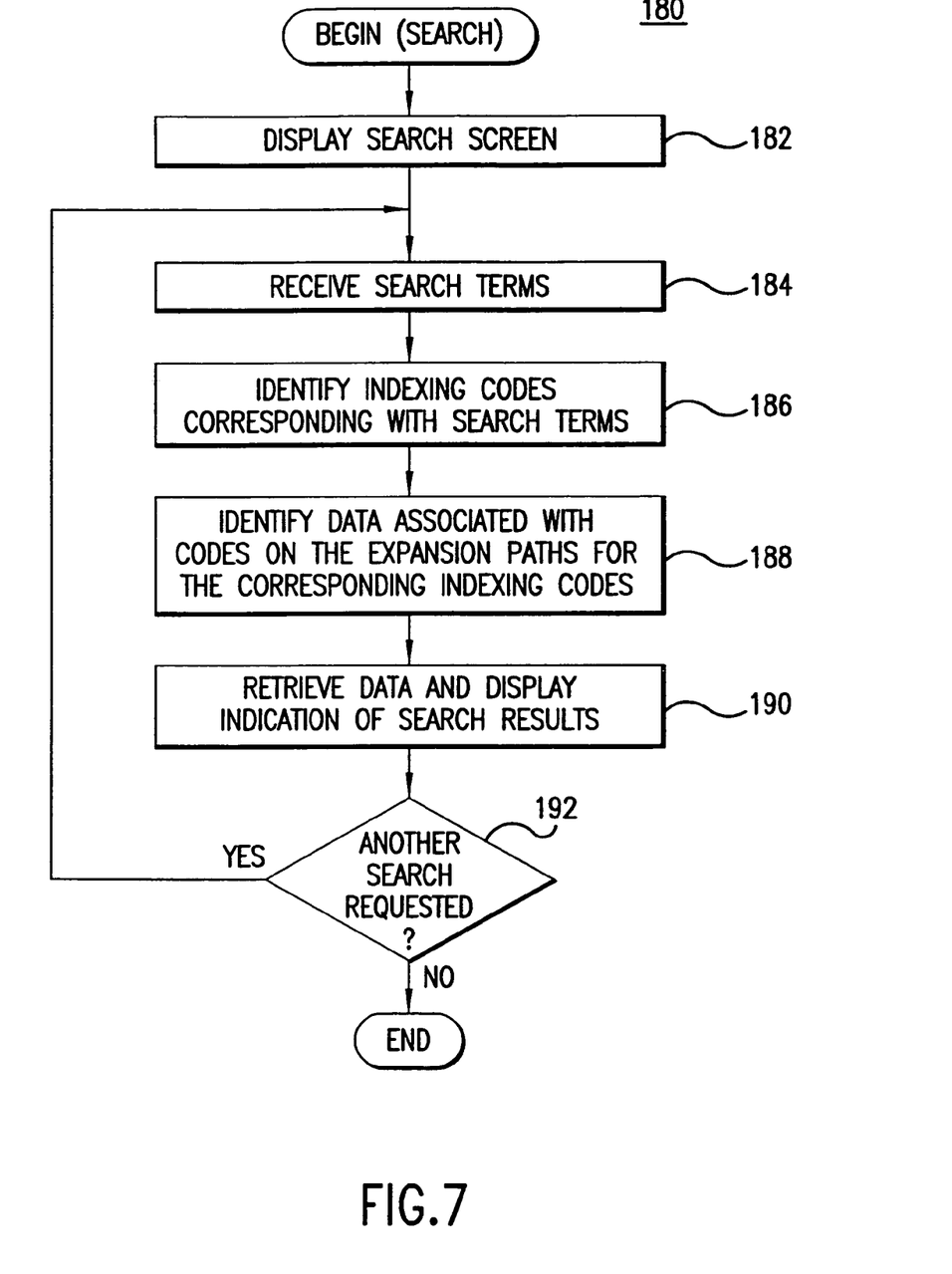
FIG. 7 is a flow chart of a method for searching data based upon indexing codes.

FIG. 7 is a flow chart of a method 180 for searching data based upon indexing codes. Method 180 can be implemented, for example, in software modules stored in memory 102 for execution by processor 104 along with appropriate user interaction, if required, via input device 108. In method 180, the system displays a search screen for permitting the user to search data (step 182).

Figure 10:
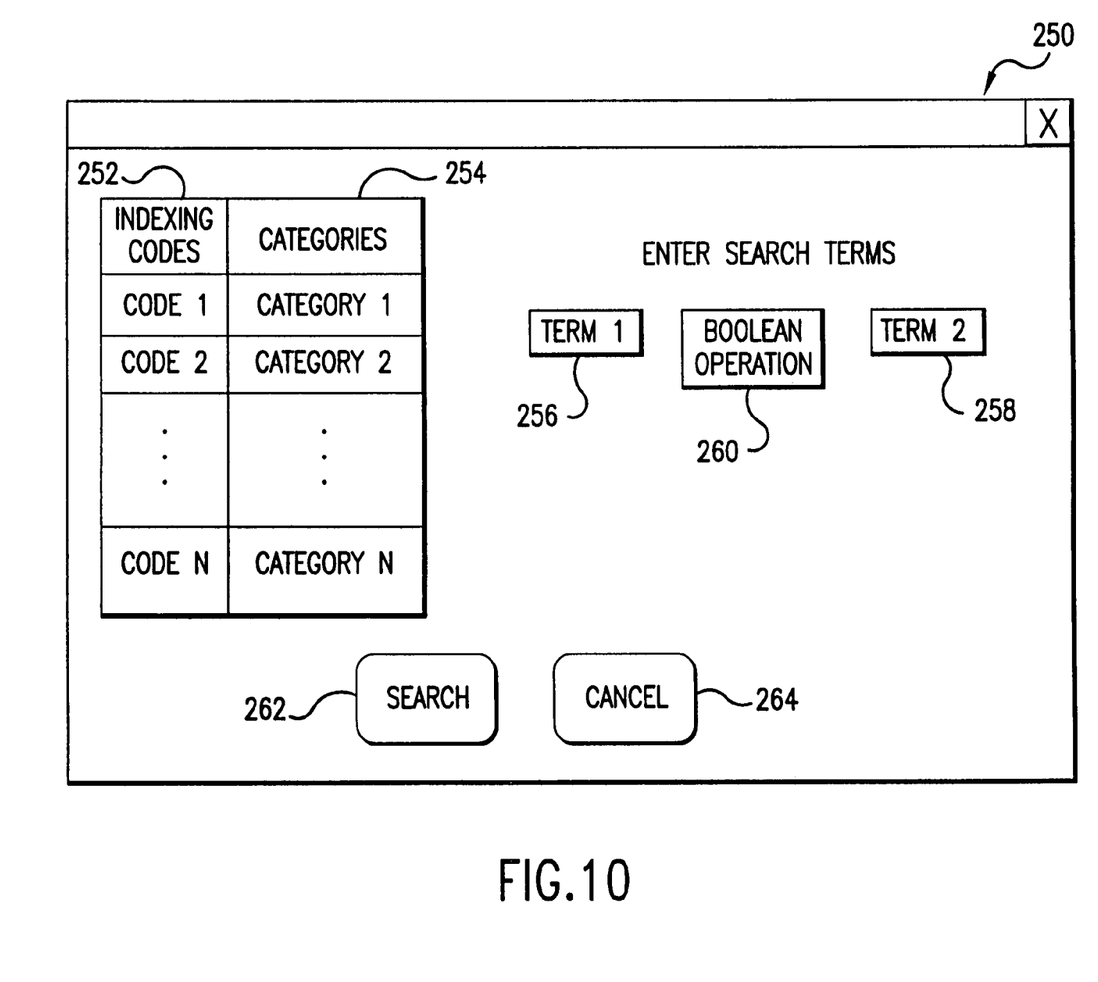
FIG. 10 is a diagram of an exemplary user interface for searching data using indexing codes.

FIG. 10 is a diagram of an exemplary user interface 250 for a search screen. Screen 250 can be displayed on display device 114, and it may include indexing codes section 252 (to display indexing codes) and categories section 254 (to display the categories) as described with respect to screen 200. Sections 256 and 258 allow a user to enter search terms. For example, the user can type indexing codes or corresponding categories in the sections or "drag and drop" indexing codes from indexing codes section 252 using a cursor control device. A section 260 allows the user to enter a Boolean operation, such as AND or OR, for the terms in sections 256 and 258. Screen 250 can alternatively include sections to enter more than two search terms, or be used to search for only one entered term. Selection of a search section 262 initiates a search using the entered term or terms along with any specified Boolean operator. Selection of a cancel section 264 cancels the requested search.

In method 180, the system receives search terms through such ways as entry of indexing codes in sections 256 and 258 (step 184). The system identifies indexing codes corresponding with the entered search terms by, for example, detecting the actual entered codes or linking entered information such as categories with indexing codes (step 186). The system searches the indexed data to identify data associated with expansion paths for the indexing codes (step 188). By using the expansion paths, the system can search for data associated with codes along the expansion paths having the entered search term, potentially providing for a robust and thorough search of the indexed data. The data identified through the search is retrieved and an indication of the search results is displayed (step 190). For example, the system can display the number of occurrences of the search terms and then allow the user to view the data corresponding with each occurrence.

While the present invention has been described in connection with an exemplary embodiment, it will be understood that many modifications will be readily apparent to those skilled in the art, and this application is intended to cover any adaptations or variations thereof. For example, different indexing rules, categorization, and sub-categorization may be used without departing from the scope of the invention. This invention should be limited only by the claims and equivalents thereof.

What is claimed is:

1. A computerized method for indexing data using automatically generated indexing codes, comprising:
   receiving the data to be indexed;
   receiving an automatically generated indexing code related to the data;
   retrieving an automatically generated expansion set of codes associated with the automatically generated indexing code;
   associating the automatically generated expansion set of codes with the data; and
   storing an indication of the data associated with the automatically generated expansion set of codes.

2. The method of claim 1, wherein the receiving the data step includes receiving one or more of the following: text, graphics, images, photographic information or information in multiple languages.

3. The method of claim 1, wherein the receiving the automatically generated indexing code step includes receiving a code providing an indication of one or more of the following: company information, geographic information, subject matter information or industry information.

4. The method of claim 1, wherein the receiving the automatically generated indexing code step includes receiving a code for a particular category relating to the data; and
   the retrieving the automatically generated expansion set of codes step includes retrieving one or more automatically generated indexing codes identifying increasingly more general categories in relation to the particular category.

5. The method of claim 1, further including receiving and implementing a change in the automatically generated expansion set of codes.

6. The method of claim 1, wherein the retrieving the automatically generated expansion set of codes step includes retrieving a set of codes having multiple related levels of indexing for the data.

7. The method of claim 1, further including displaying a user interface to present the data and receive the indexing code.

8. The method of claim 7, wherein the receiving the automatically generated indexing code step includes receiving the automatically generated indexing code based upon an entry via the user interface.

9. The method of claim 1, further including searching the data using the automatically generated expansion set of codes.

10. The method of claim 1, further including:
identifying a key term in the data;
determining whether the key term is associated with the automatically generated indexing code; and
automatically retrieving the automatically generated expansion set of codes based upon the determination.

11. A computerized method for indexing data, comprising:
receiving the data to be indexed;
receiving an automatically generated indexing code related to the data;
retrieving automatically generated polyarchical codes associated with the automatically generated indexing code;
associating the automatically generated polyarchical codes with the data; and
storing an indication of the data associated with the automatically generated polyarchical codes.

12. The method of claim 11, wherein the receiving the data step includes receiving one or more of the following: text, graphics, images, photographic information or information in multiple languages.

13. The method of claim 11, wherein the receiving the automatically generated indexing code step includes receiving a code providing an indication of one or more of the following: company information, geographic information, subject matter information or industry information.

14. The method of claim 11, wherein:
the receiving the automatically generated indexing code step includes receiving a code for a particular category relating to the data; and
the retrieving the automatically generated polyarchical codes step includes retrieving, for at least one of the automatically generated polyarchical codes, one or more automatically generated indexing codes identifying increasingly more general categories in relation to the particular category.

15. The method of claim 11, further including receiving and implementing a change in the automatically generated polyarchical codes.

16. The method of claim 11, further including displaying a user interface to present the data and receive the automatically generated indexing code.

17. The method of claim 16, wherein the receiving the automatically generated indexing code step includes receiving the automatically generated indexing code based upon an entry via the user interface.

18. The method of claim 11, further including searching the data using the automatically generated polyarchical codes.

19. The method of claim 11, further including:
identifying a key term in the data;
determining whether the key term is associated with the automatically generated indexing code; and
automatically retrieving at least one of the automatically generated polyarchical codes based upon the determining.

20. The method of claim 11, wherein the retrieving the automatically generated polyarchical codes step includes:
retrieving a first automatically generated indexing code associated with a first category at a particular hierarchical level related to the data; and
retrieving a second automatically generated indexing code associated with a second category, different from the first category, at the particular hierarchical level.

21. The method of claim 11, wherein the retrieving the automatically generated polyarchical codes step includes:
retrieving a first automatically generated expansion set of codes specifying a first hierarchical indexing path to a the first category; and
retrieving a second automatically generated expansion set of codes specifying a second hierarchical indexing path to a the second category different from the first category.

22. A computer storage medium for indexing data, comprising:
a module for receiving the data to be indexed;
a reception module for receiving an automatically generated indexing code related to the data;
a retrieval module for retrieving an automatically generated expansion set of codes associated with the automatically generated indexing code;
a module for associating the automatically generated expansion set of codes with the data; and
a module for storing an indication of the data associated with the automatically generated expansion set of codes.

23. The apparatus of claim 22, wherein the module for receiving data includes a module for receiving one or more of the following: text, graphics, images, photographic information or information in multiple languages.

24. The apparatus of claim 22, wherein the reception module includes a module for receiving a code providing an indication of one or more of the following: company information, geographic information, subject matter information or industry information.

25. The apparatus of claim 22, wherein:
the reception module includes a module for receiving a code for a particular category relating to the data; and
the retrieval module includes a module for retrieving one or more automatically generated indexing codes identifying increasingly more general categories in relation to the particular category.

26. The apparatus of claim 22, further including a module for receiving and implementing a change in the automatically generated expansion set of codes.

27. The apparatus of claim 22, wherein the retrieval module includes a module for retrieving a set of automatically generated codes having multiple related levels of indexing for the data.

28. The apparatus of claim 22, further including a module for displaying a user interface to present the data and receive the automatically generated indexing code.

29. The apparatus of claim 28 wherein the reception module includes a module for receiving the automatically generated indexing code based upon an entry via the user interface.

30. The apparatus of claim 22, further including a module for searching the data using the automatically generated expansion set of codes.

31. The apparatus of claim 22, further including:
a module for identifying a key term in the data;
a module for determining whether the key term is associated with the automatically generated indexing code; and
a module for automatically retrieving the automatically generated expansion set of codes based upon the determination.

32. A computer storage medium for indexing data, comprising:
a module for receiving the data to be indexed;

a reception module for receiving an automatically generated indexing code related to the data;

a retrieval module for retrieving automatically generated polyarchical codes associated with the automatically generated indexing code;

a module for associating the automatically generated polyarchical codes with the data; and a module for storing an indication of the data associated with the automatically generated polyarchical codes with the data.

33. The apparatus of claim 32, wherein the module for receiving data includes a module for receiving one or more of the following: text, graphics, images, photographic information or information in multiple languages.

34. The apparatus of claim 32, wherein the reception module includes a module for receiving a code providing an indication of one or more of the following: company information, geographic information, subject matter information or industry information.

35. The apparatus of claim 32, wherein:

the reception module includes a module for receiving a code for a particular category relating to the data; and the retrieval module includes a module for retrieving, for at least one of the automatically generated polyarchical codes, one or more automatically generated indexing codes identifying increasingly more general categories in relation to the particular category.

36. The apparatus of claim 32, further including a module for receiving and implementing a change in the automatically generated polyarchical codes.

37. The apparatus of claim 32, further including a module for displaying a user interface to present the data and receive the automatically generated indexing code.

38. The apparatus of claim 37, wherein the reception module includes a module for receiving the automatically generated indexing code based upon an entry via the user interface.

39. The apparatus of claim 32, further including a module for searching the data using the automatically generated polyarchical codes.

40. The apparatus of claim 32, further including:

a module for identifying a key term in the data;

a module for determining whether the key term is associated with the automatically generated indexing code; and a module for automatically retrieving at least one of the automatically generated polyarchical codes based upon the determination.

41. The apparatus of claim 32, wherein the retrieval module includes:

a module for retrieving a first automatically generated indexing code associated with a first category at a particular hierarchical level related to the data; and a module for retrieving a second automatically generated indexing code associated with a second category, different from the first category, at the particular hierarchical level.

42. The apparatus of claim 32, wherein the retrieval module includes:

a module for retrieving a first automatically generated expansion set of codes specifying a first hierarchical indexing path to a first category; and a module for retrieving a second automatically generated expansion set of codes specifying a second hierarchical indexing path to a second category different from the first category.

* * * * *